(12) United States Patent
Shah et al.

(10) Patent No.: US 7,587,449 B2
(45) Date of Patent: Sep. 8, 2009

(54) METHOD AND SYSTEM FOR CALCULATING PERFORMANCE METRICS USING BACKCHANNEL MESSAGING AND INFORMATION PATTERN MATCHING

(75) Inventors: Achal K. Shah, Redmond, WA (US); Alexandre M. Gimenez, Woodinville, WA (US); Ansuman Kar, Redmond, WA (US); Doru C. Nica, Sammamish, WA (US); George W. Routon, Redmond, WA (US); Tyrone Sequeira, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1161 days.

(21) Appl. No.: 11/067,595

(22) Filed: Feb. 25, 2005

(65) Prior Publication Data

US 2006/0195455 A1 Aug. 31, 2006

(51) Int. Cl.
*G06F 15/16* (2006.01)
*G06F 15/173* (2006.01)

(52) U.S. Cl. ............... 709/203; 709/206; 709/207; 709/223; 709/224

(58) Field of Classification Search ............... 709/203, 709/206–207, 223–224
See application file for complete search history.

(56) References Cited

U.S. PATENT DOCUMENTS

2008/0104230 A1* 5/2008 Nasuto et al. ............... 709/224

* cited by examiner

*Primary Examiner*—Vivek Srivastava
*Assistant Examiner*—Thomas Duong
(74) *Attorney, Agent, or Firm*—Perkins Coie LLP

(57) ABSTRACT

A client utilizes a backchannel messaging infrastructure and information matching logic to measure server performance characteristics at the client without requiring the server to correlate command responses to command requests. The backchannel messaging infrastructure facilitates the sending of messages between clients, and allows a client to send to the interested clients messages containing an activity start timestamp and identifying the requested activity when sending a command request to a server. The information matching logic enables each client to measure server performance by matching command requests, as indicated by the backchannel messages, and command responses based on message types, identification of the sender (i.e., the client that generated the original command request), and identifier attributes that are unique to the command requests and command responses.

16 Claims, 7 Drawing Sheets

Client A

| Command Index | Command Type | Command Timestamp | Matching Parameters | Client ID | Command Response Type | Response Timestamp | Result | Timer ID |
|---|---|---|---|---|---|---|---|---|
| ... | | | | | | | | |
| ① 99 | ① flip slide | ① 12:00:01 | ① slide #2 | ① A | ⑥ show slide | ⑥ 12:00:05 | ⑥ success | ① T99 |
| ⑦ 100 | ⑧ flip slide | ⑧ 12:00:02 | ⑦ slide #5 | ⑧ B | ⑦ show slide | ⑦ 12:00:08 | ⑧ success | |
| ... | | | | | | | | |

Client B

| Command Index | Command Type | Command Timestamp | Matching Parameters | Client ID | Command Response Type | Response Timestamp | Result | Timer ID |
|---|---|---|---|---|---|---|---|---|
| ... | | | | | | | | |
| ③ 201 | ③ flip slide | ③ 12:00:02 | ③ slide #5 | ③ B | ⑦ show slide | ⑦ 12:00:08 | ⑦ success | ③ T201 |
| ④ 202 | ④ flip slide | ④ 12:00:01 | ④ slide #2 | ④ A | ⑥ show slide | ⑥ 12:00:05 | ⑥ success | ④ T202 |
| ... | | | | | | | | |

① Client A requests server to flip slide to slide #2
② Client A sends backchannel message to Client B
③ Client B requests server to flip slide to slide #5
④ Client B receives backchannel message regarding slide #2
⑤ Client B sends backchannel message to Client A
⑥ Client A & Client B receive response message from server to show slide #2
⑦ Client A & Client B receive response message from server to show slide #5
⑧ Client A receives backchannel message regarding slide #5

*FIG. 6*

| Command Index | Command Type | Command Timestamp | Matching Parameters | Client ID | Command Response Type | Response Timestamp | Result | ... |
|---|---|---|---|---|---|---|---|---|
| ... | | | | | | | | |
| ① 99 | ① flip slide | ① 12:00:01 | ① slide #2 | ① A | ⑤ show slide | ⑤ 12:00:05 | ⑤ success | |
| ③ 100 | ③ flip slide | ③ 12:00:02 | ③ slide #5 | ③ B | | | ⑥ failure | |
| ④ 101 | ④ flip slide | ④ 12:00:03 | ④ slide #6 | ④ B | ⑥ show slide | ⑥ 12:00:08 | ⑥ success | |

① Client A requests server to flip slide to slide #2
② Client A sends backchannel message to interested clients
③ Client A receives backchannel message regarding slide #5 from Client B
④ Client A receives backchannel message regarding slide #6 from Client B
⑤ Client A receives response message from server to show slide #2
⑥ Client A receives response message from server to show slide #6

*FIG. 7*

METHOD AND SYSTEM FOR CALCULATING PERFORMANCE METRICS USING BACKCHANNEL MESSAGING AND INFORMATION PATTERN MATCHING

TECHNICAL FIELD

The described technology is directed generally to testing software applications and, more particularly, to measuring server performance characteristics.

BACKGROUND

The proliferation of computers and the advent of the Internet and the maturing of the World Wide Web ("web") have resulted in the development of new and improved software applications for both business and personal uses. Examples of software applications include collaboration applications, chat room applications, instant messaging applications, conferencing applications, gaming applications, and the like. These software applications are commonly based on the client-server paradigm, where the software application or system is split between server tasks and client tasks. In client-server terminology, the client sends a request to the server, according to some protocol, typically asking the server to perform an action and the server responds to the client's request. These servers are often tested prior to commercial release in order to ensure proper operation of the servers.

One aspect of application testing focuses on ensuring reliable operation of a server under anticipated loads. Load testing is a process by which a server is tested under load—i.e., stress—that the server is likely to experience in a real operation environment. Load tests are end-to-end performance tests that test the server under an anticipated production load, which is typically based on a prediction of how the end users—i.e. clients—would use the server. One objective of the load tests is to measure the capability of the server to function correctly under load. Another objective of the load tests is to determine the response times—i.e., performance—for various operations performed by the server.

There are a number of traditional approaches to measuring the performance of a server. One approach is to use measurement tools that execute on the server, and which allows for the measurement of the time duration between when the server receives a command request until when the server responds with a command response. While this approach may be adequate for measuring performance within the server, this approach does not provide a true end-to-end performance measurement since it fails to account for the time taken for the command request to go from an issuing client to the server, and the time taken for the command response to go from the server to the clients that are affected by the command request—i.e., the clients that should receive a response from the server as a result of the command request.

Another approach is to use measurement tools that execute on the client, and which allow for the measurement of the time duration between when the client issues a command request to a server until when the client receives a command response from the server. This approach may be adequate for measuring the performance of requests that only affect the issuing client if the client does not make further command requests to the server until receiving the command response to the first command request. This is because the command response does not identify the client that originally made the command request that caused this command response. Even if this approach may be adequate for measuring the performance of commands that only affect the issuing client, this approach does not provide a true end-to-end performance measurement of commands that affect clients other than the issuing client for at least the reason stated above.

It would be desirable to have a technique that allows for measuring performance characteristics in a client-server environment without requiring the server to correlate command responses to command requests.

BRIEF DESCRIPTION OF THE DRAWINGS

FIG. 6 is a display description illustrating how a client matches command requests and command responses, according to one embodiment.

FIG. 7 is a display description illustrating how a client purges unmatched entries in its request-response matching table, according to one embodiment.

DETAILED DESCRIPTION

Figure 1:
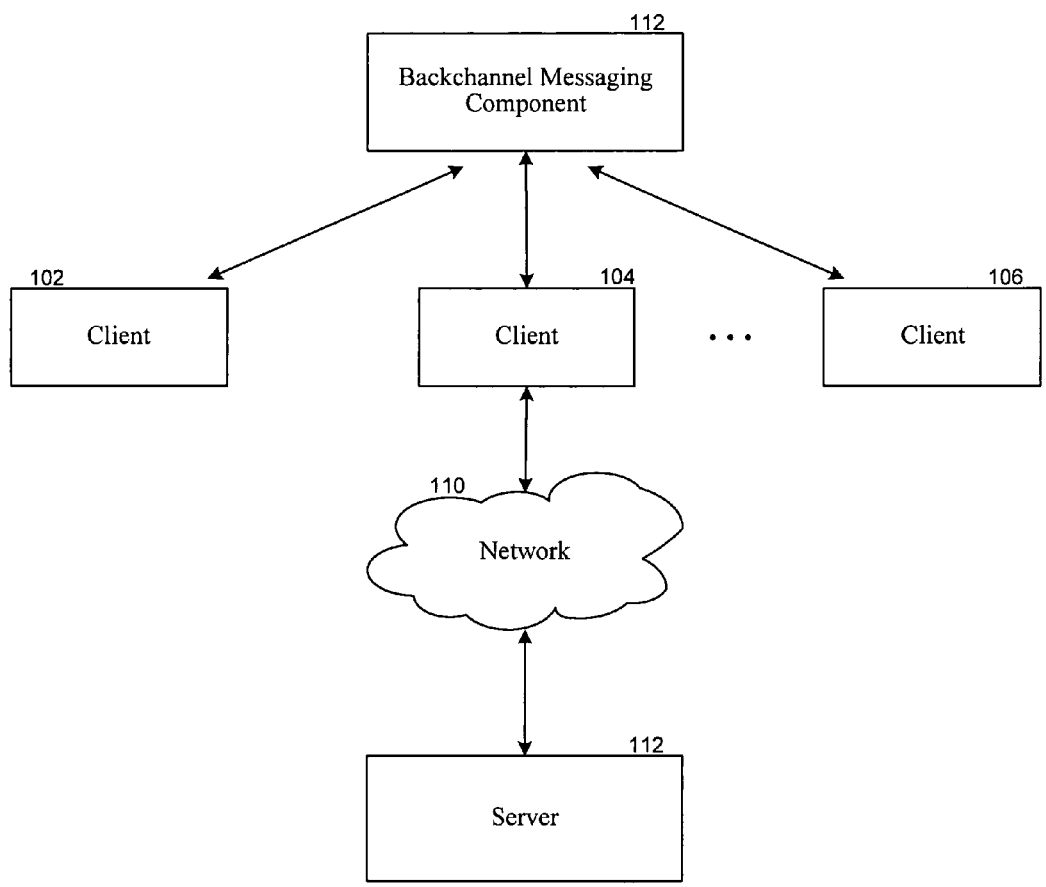
FIG. 1 is a high-level block diagram illustrating an environment in which the described techniques may operate.

A method and system for measuring server performance characteristics in a client-server environment is provided. In particular, the measurement techniques allow for measuring server performance at the client without requiring the server to correlate command responses to command requests. In one embodiment, the clients that are testing the server utilize backchannel messaging and information matching logic to calculate server performance—e.g., activity latencies—at the clients without involving the server in the performance measurement process. The backchannel messaging infrastructure facilitates the relaying of a message or messages to all clients, a select group of clients, or a single client. The information matching logic measures server performance by matching command requests and command responses based on message types, identification of the sender (i.e., the client that generated the original command request), and identifier attributes that are unique to the command requests and command responses.

In one embodiment, a client generates a message containing an activity start timestamp (also referred to as a "command timestamp") and a command identifier when sending a command request to a server. The client sends the message—i.e., the backchannel message—to all interested clients using the backchannel messaging mechanism. The interested clients are the clients that should be receiving a command response from the server as a result of the command request. Upon receiving the backchannel message, a client first attempts to match the received backchannel message to a previously received command response. If a match is found, the client calculates the activity latency. If a match is not found, the client stores the attributes contained in the backchannel message in the request-response matching table. The sending client—i.e., the client that originated the backchannel message, may store the attributes contained in the backchannel message in its request-response matching table. For example, the sending client creates an entry in the table for the backchannel message if it expects to receive a command response from the server as a result of sending the command request.

When the clients (which may or may not include the original sender of the command request based on the command request) receive a command response from the server, each client generates an activity end timestamp (also referred to as a "command response timestamp") based on when the client received the command response. Each client then tries matching the command response to the backchannel messages stored in its request-response matching table based on a combination of identifier attributes of the command request and the command response. If a match is found, the client calculates activity latency as the time difference between the activity start timestamp and the activity end timestamp. If a match is not found, the client stores the attributes contained in the command response in the request-response matching table, in order to possibly match the command response to a later-arriving backchannel message, and to calculate the corresponding activity latency.

The performance measurement taken at each of the clients can also be gathered to calculate an aggregate or average performance measurement across a representative sample—i.e., multiple clients.

FIG. 1 is a high-level block diagram illustrating an environment in which the described techniques may operate. As depicted, the environment comprises clients 102-106 coupled to a server 108 through a network 110, and each client is also coupled to a backchannel messaging component 112. In general terms, the clients are client application test programs that are used to test the performance of the server by making requests to the server to perform actions, receiving responses from the server, and measuring the end-to-end performance of the server. As such, the clients may be developed using components, such as the dynamic link libraries and the lower-level API, of the native client application of the server. Each client comprises logic to send command request messages, receive command response messages, match the received command response messages to their corresponding requests, and send and receive backchannel messages. The server is the server under test, and may be any server application for which performance testing is desired.

The network is a communications link that facilitates the transfer of electronic content between, for example, the clients and the server. In one embodiment, the network includes the Internet. It will be appreciated that the network may be comprised of one or more other types of networks, such as a local area network, a wide area network, a point-to-point dial-up connection, and the like. It will also be appreciated that the network may not be present. For example, clients and the server may both reside on the same computing system and communicate via communication mechanisms, such as, inter-process communication, remote function call, internal communication buses, etc., typically supported on the computing system.

The backchannel messaging component facilitates communications between the coupled clients. The backchannel messaging component utilizes a transport mechanism, such as TCP/IP, to enable a client to send backchannel messages to a targeted client or to a group of clients, including all the clients, using target client identifiers and/or target addressing types. In one embodiment, each client establishes a communication channel between itself and the backchannel messaging component. Upon establishing the communication channel, the client may send a backchannel message specifically addressed to a targeted client to the backchannel messaging component, causing the backchannel messaging component to relay the backchannel message to the targeted client. The client may also send a backchannel message addressed to a group of clients—e.g., multi-cast or broadcast—to the backchannel messaging component, causing the backchannel messaging component to relay the backchannel message to each client in the addressed group. The address may be an actual address, such as a network address, or some other identifier that identifies the clients. For example, the address may be a user name with which a client is identified by the server. In another example, assuming an environment where the server is a collaboration server capable of hosting meeting, the address may identify all attendees in a particular meeting, the presenters in a particular meeting, the attendees in a particular meeting, etc.

In another embodiment, the clients may send and receive backchannel messages using a network, such as network 110. For example, each client may establish a communication channel via the network with each of the other clients. The collection of these communication channels may be considered the backchannel messaging component, and the clients may then send backchannel messages to another client or multiple clients using the established communication channels.

In one embodiment, each client creates and utilizes a request-response matching table to match command response messages received from the server to their matching command requests in order to calculate end-to-end server performance in processing the command request. By way of example, the request-response matching table contains the following nine columns, with their column definitions:

command index: uniquely identifies each entry (row) in the table;

command type: identifies the activity the server is requested to perform;

command timestamp: timestamp when the command request was sent by the sending client (this is the time generated on the client);

matching parameters: information other than or in addition to the command type, and which is needed to identify a command request or a command response;

client ID: identifies the client that sent the command request to the server;

command response type: identifies type of command response received from the server;

response timestamp: timestamp when the command response was received;

result: matching result for the entry/record (state of the record); and timer ID: identifies the timeout timer for the entry/record.

The request-response match table and, in particular, the client's use of the request-response matching table is further discussed below.

The computer systems on which the server, the clients, the backchannel messaging component, and other components described herein can execute may include a central processing unit, memory, input devices (e.g., keyboard and pointing devices), output devices (e.g., display devices), and storage devices (e.g., disk drives). The memory and storage devices are computer-readable media that may contain instructions that implement the server application, client application, and other components. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the described techniques may be implemented in various operating environments that include personal computers, server computers, computing devices, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The techniques may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
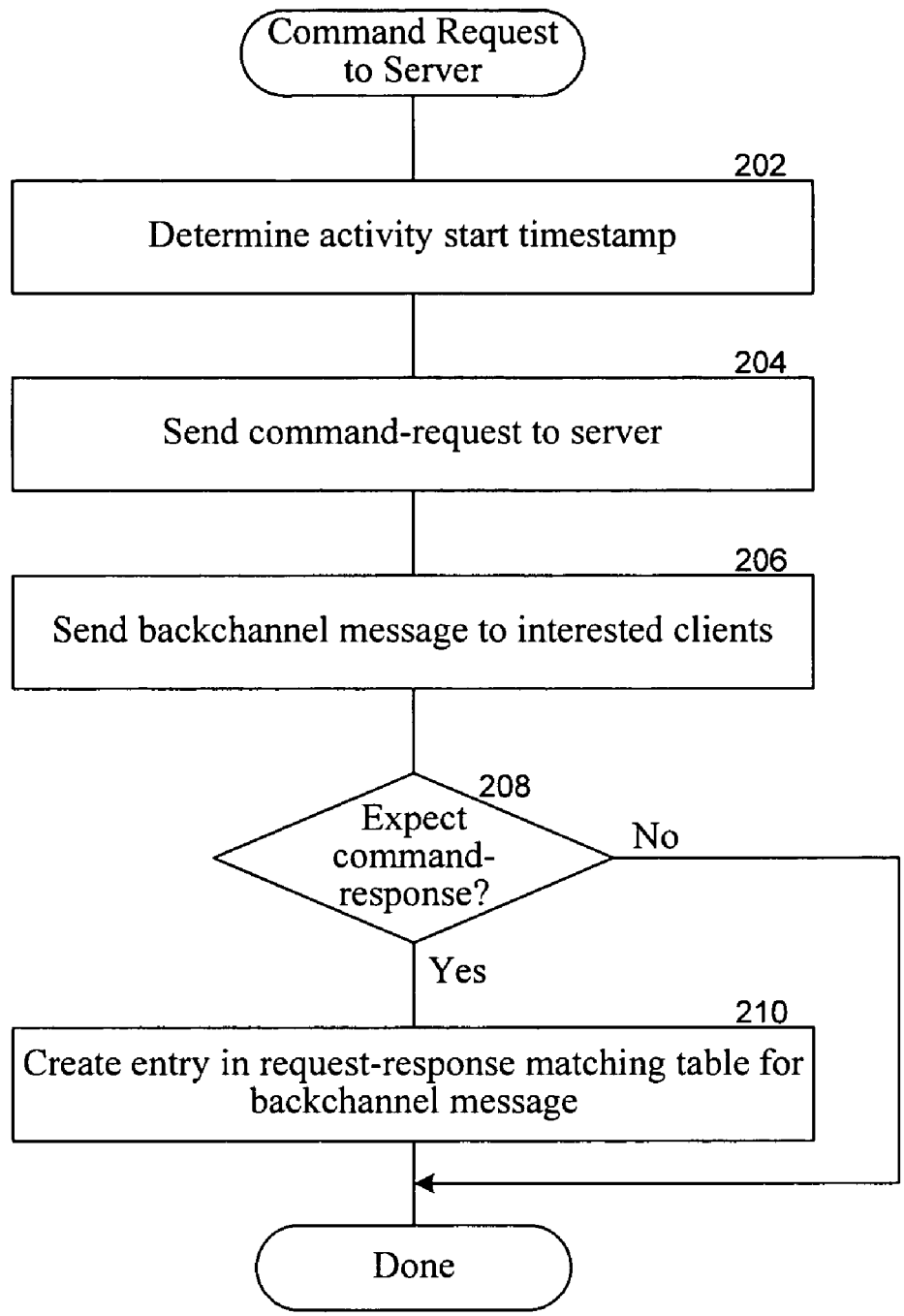
FIG. 2 is a flow diagram that illustrates the processing of a client when it sends a command request to a server, according to one embodiment.

FIG. 2 is a flow diagram that illustrates the processing of a client when it sends a command request to a server, according to one embodiment. By way of example, the server being tested may be a collaboration server that is hosting a plurality of meetings, and the clients may be testing the server to generate latency metrics. In block 202, a client that is about to request a server activity determines an activity start timestamp for the command request. The client may determine the activity start timestamp from its system clock. In block 204, the client sends the command request to the server. The activity start timestamp records, as accurately as possible, the time that the command request is sent to the server. In block 206, the client sends a backchannel message through the backchannel messaging component to the interested clients. The backchannel message corresponds to the command request that was sent to the server, and identifies the activity that was requested of the server in the command request, any additional information that is needed to identify the corresponding command request type, and the time the activity was requested—i.e., the activity start time. The interested clients are the clients that should be receiving a command response from the server as a result of the activity requested in the command request. In block 208, the client that sent the command request to the server checks to determine whether it is going to receive a command response from the server as a result of the activity requested in the command request. If the client determines that it should receive a command response, then, in block 210, the client creates an entry in its command-request matching table for the backchannel message that it sent to the interested clients. Subsequent to creating an entry in the request-response matching table, or determining that it should not receive a command response from the server, the client is done processing the sending of the command request, and continues processing, for example, other commands. In another embodiment, if the client expects to also receive a command response, the client can include itself as an interested client when sending the backchannel message, which will cause the client to also receive the backchannel message.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps without detracting from the essence of the invention.

Figure 3:
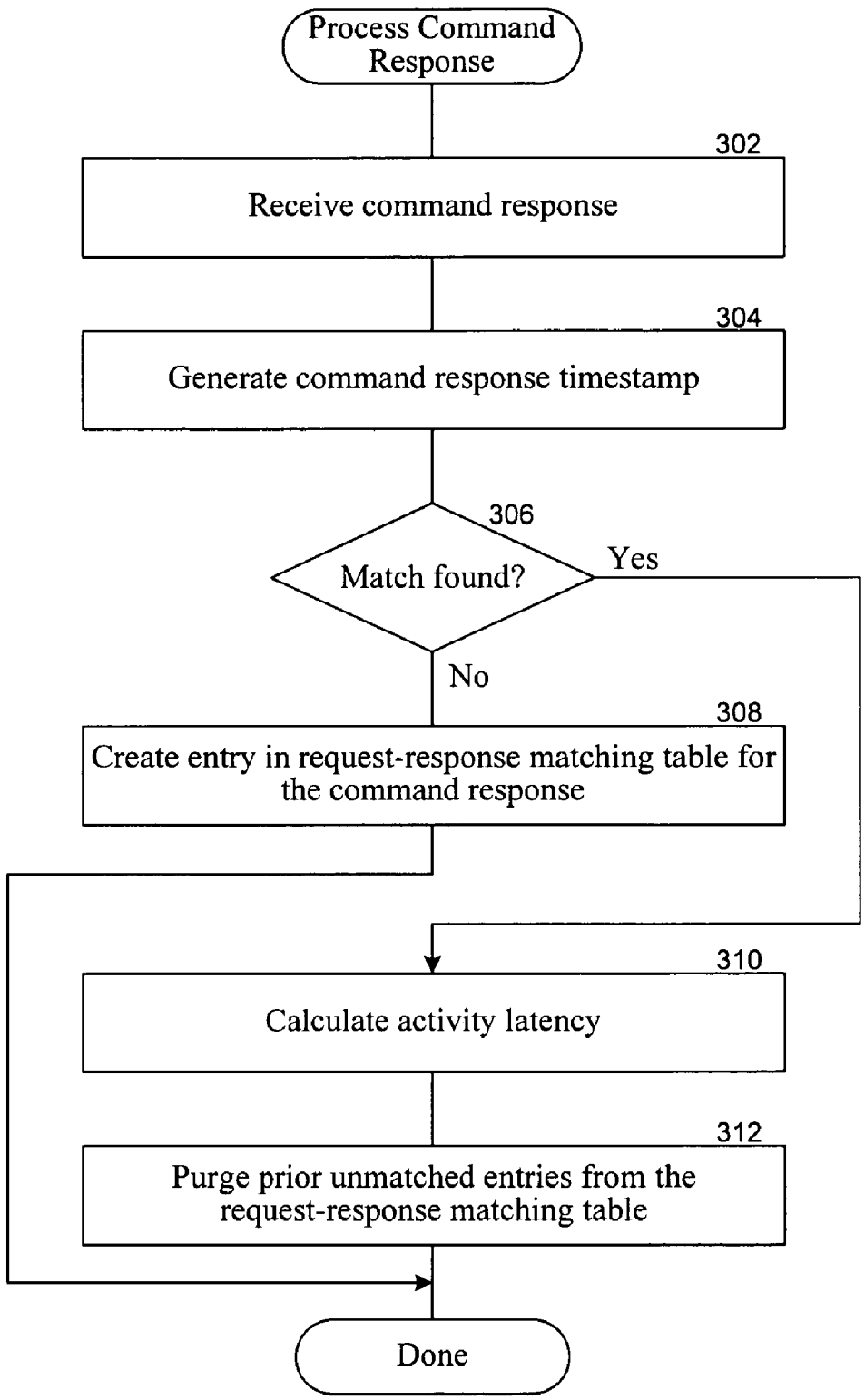
FIG. 3 is a flow diagram that illustrates the processing of a client when it receives a command response from a server, according to one embodiment.

FIG. 3 is a flow diagram that illustrates the processing of a client when it receives a command response from a server, according to one embodiment. Continuing the above example, the client may be one of the clients that are testing the server to generate latency metrics. In block 302, the client receives a command response from the server. The command response may be a response from the server to an activity that was requested in a prior command request. In block 304, the client generates a response timestamp for the received command response. The client may determine the response timestamp from its system clock. The response timestamp records, as accurately as possible, the time that the command response was received by the client. In block 306, the client checks to determine whether the received command response matches an entry for a backchannel message—i.e., the command request messages sent to the server—in its request-response matching table. In one embodiment, the client determines whether there is a match based on attributes, such as message type and other identifier attributes that are unique to the received command response and its matching command request.

If the client determines that the received command response does not match any entry in its request-response matching table, then in block 308, the client creates an entry in its request-response matching table that corresponds to the received command response. In one embodiment, the client retrieves from the received command response parameters, such as the command response type and other additional information that is needed to identify the corresponding command response type, and stores this information, along with the corresponding command response timestamp, as a new entry in the request-response matching table. The client makes this entry in order to account for latencies or delays in the backchannel messaging component. For example, in the case where the backchannel message that corresponds to this command response arrives at the client at a later point in time, the client will be able to match the received command response to the later-arriving backchannel message.

If the client determines that the received command response matches an entry in its request-response matching table, then in block 310, the client calculates the activity latency. In one embodiment, the client calculates the activity latency as the difference between the command timestamp recorded in the matching entry in the request-response matching table—i.e., the activity start timestamp—and the command response timestamp corresponding to the received command response. Thus, the calculated activity latency is a measurement of the time taken from the time the command request was sent at the originally requesting client to the time the response to the command request was received at this particular client. In order to correctly calculate latencies, the system clocks of the clients that are involved need to be synchronized. In one embodiment, the clients may synchronize their system clocks by executing, for example, Network Time Protocol (NTP) clients. In one embodiment, the client may "complete" the matching entry in the request-response matching table by filling in the information from the received command response, and indicate that the entry was successfully matched. In block 312, the client purges prior unmatched entries from its request-response matching table. Subsequent to creating an entry in the request-response matching table, or calculating the activity latency associated with the received command response, the client continues processing, for example, other commands. Purging unmatched entries is further discussed below in conjunction with FIG. 5.

Figure 4:
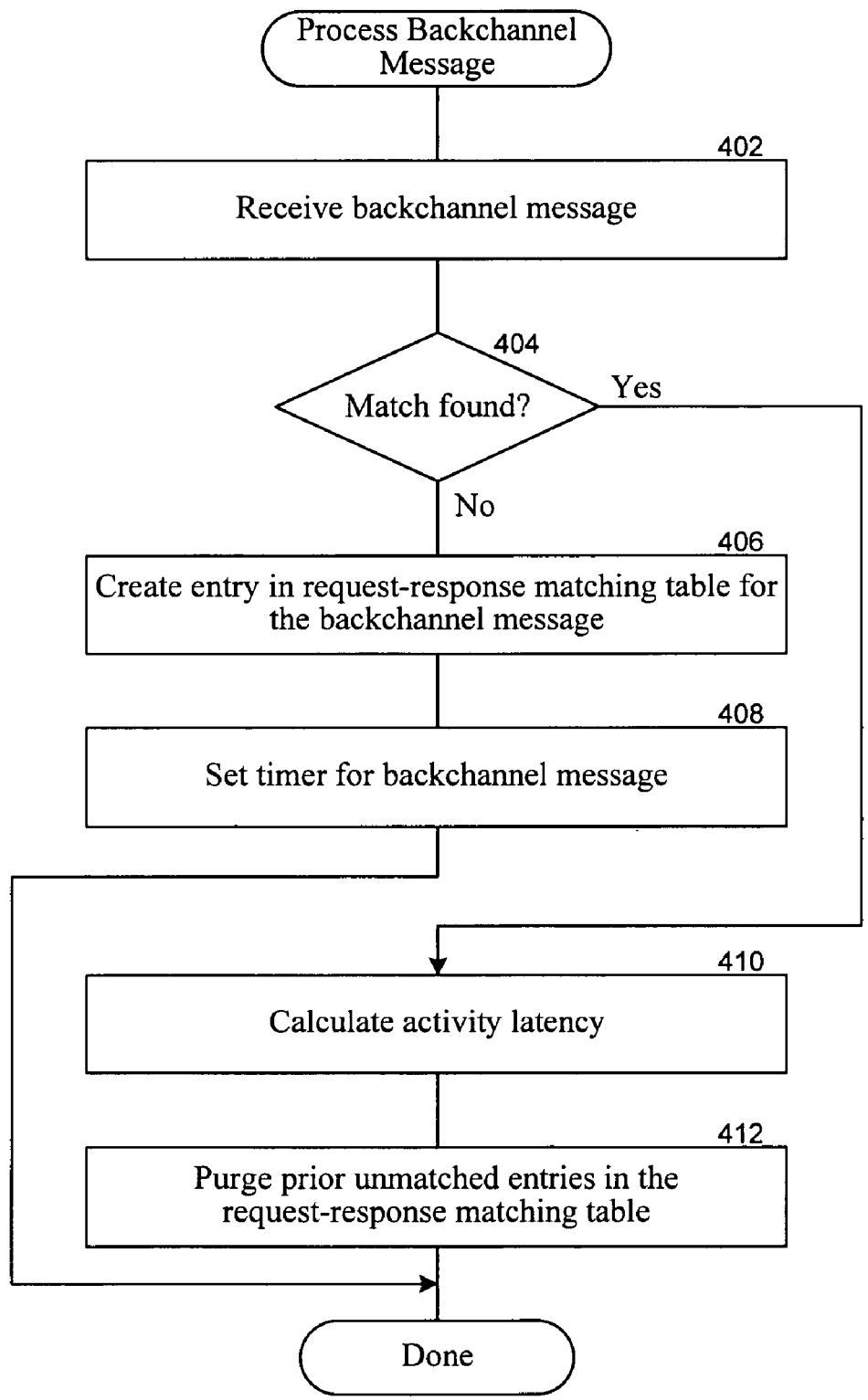
FIG. 4 is a flow diagram that illustrates the processing of a client when it receives a backchannel message, according to one embodiment.

FIG. 4 is a flow diagram that illustrates the processing of a client when it receives a backchannel message, according to one embodiment. Continuing the above example, the client may be one of the clients that are testing the server to generate latency metrics. In block 402, the client receives a backchannel message. In block 404, the client checks to determine whether the received backchannel message matches an entry for a previously received command response from the server in its request-response matching table. In one embodiment, the client determines whether there is a match based on attributes, such as message type and other identifier attributes that are unique to the received backchannel message and its matching command response.

If the client determines that the received backchannel message does not match any entry in its request-response matching table, then in block 406, the client creates an entry in its request-response matching table that corresponds to the received backchannel message. In one embodiment, the client retrieves from the received backchannel message parameters, such as the command type and other additional information that is needed to identify the command type, and stores this information, along with the corresponding command timestamp and the identifier for the sending client (the client that sent both the backchannel message and the command request message to the client), as a new entry in the request-response matching table. The client may be able to determine the sending client from, for example, the protocol addressing used to send the backchannel message. In block 408, the client sets a timer for the received backchannel message. The timer may be a predetermined duration of time within which the matching command response message is to be received from the server. If the timer expires before the matching command response message is received, the client may generate an error condition and/or log the failure/error.

If the client determines that the received backchannel message matches an entry in its request-response matching table, then in block 410, the client calculates the activity latency. In block 412, the client purges prior unmatched entries from its request-response matching table. Subsequent to setting a timer for the newly created entry in the request-response matching table for the received backchannel message, or calculating the activity latency associated with the received backchannel message, the client continues processing, for example, other commands.

Figure 5:
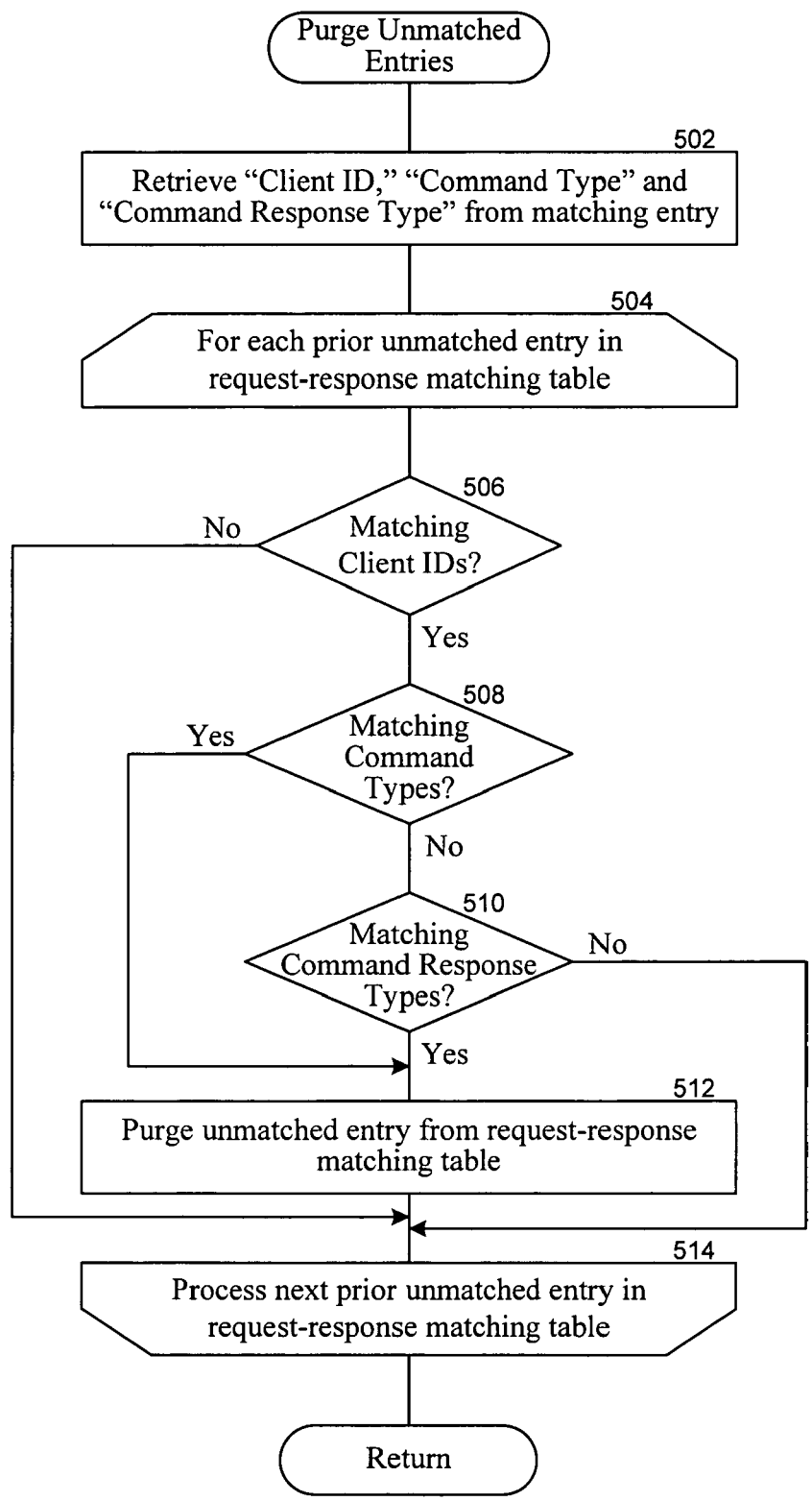
FIG. 5 is a flow diagram that illustrates the processing of a client when it purges unmatched entries in its request-response matching table, according to one embodiment.

FIG. 5 is a flow diagram that illustrates the processing of a client when it purges unmatched entries in its request-response matching table, according to one embodiment. At each client, upon finding a request-response match, the client removes from its request-response matching table all unmatched entries that are from the same original sender—i.e., the sender that sent the command request message to the server—and that are of the same request and response message type—i.e., the same type of activity—as the matched entry. This accounts for the instance where a command response message was not received at a client due to, for example, the client not being running at the time or network problems, or the client was erroneously sent a backchannel message. One skilled in the art will appreciate that the purging of the unmatched entries assumes a FIFO (first-in-first-out) server. The communication channel, between the server and the client, used to send commands and receive responses is also FIFO. For example, if the server receives a request for activity "A" and then receives a request for activity "B," the server will perform activity "A" and then activity "B."

In block 502, the client retrieves the contents of the "client ID" field, "command type" field, and "command response type" field from the matched entry in the request-response matching table. Then, for each prior unmatched entry in the request-response matching table (block 504), the client performs blocks 506 to 512, until all the unmatched entries are processed (block 514). In block 506, the client checks to determine whether the retrieved client ID matches the client ID of the unmatched entry in the request-response matching table. If the retrieved client ID does not match the client ID of the unmatched entry in the request-response matching table, the client proceeds to process the next unmatched entry in the request-response matching table.

If the retrieved client ID matches the client ID of the unmatched entry in the request-response matching table, the client checks for either matching "command types" or matching "command response types." In block 508, the client checks to determine whether the retrieved command type matches the command type of the unmatched entry in the request-response matching table. If the retrieved command type does not match the command type of the unmatched entry in the request-response matching table, the client, in block 510, checks to determine whether the retrieved command response type matches the command response type of the unmatched entry in the request-response matching table. If the retrieved command response type does not match the command response type of the unmatched entry in the request-response matching table, then the client proceeds to process the next unmatched entry in the request-response matching table.

If the retrieved command type matches the command type of the unmatched entry in the request-response matching table (block 508) or the retrieved command response type matches the command response type of the unmatched entry in the request-response matching table (block 510), then, in block 512, the client purges the unmatched entry from the request-response matching table, and the purged entry is not used for subsequent matches. For example, the client may indicate in the "result" field that there is no match for the entry.

FIG. 6 is a display description illustrating how a client matches command requests and command responses, according to one embodiment. In the illustrated example, the server may be hosting a meeting in which the two clients, "Client A" and "Client B" are the participants. Even though the example illustrates the matching technique using only two clients, one skilled in the art will appreciate that the illustrated technique need not be so limited, and that the technique may readily apply to any number of clients.

Client A sends a command request message to the server requesting the server to flip slide to slide #2 at time 12:00:01 (Stage 1). Upon sending this command request message, Client A creates a new entry (entry #99) in its request-response matching table that corresponds to the command request message since Client A expects to receive a command response message from the server. Client A indicates in entry #99 that the command type is "flip slide," the command timestamp is "12:00:01," the matching parameters are "slide #2," the client ID is "A," and the timer ID is "T99." Client A then sends a backchannel message that corresponds to the command request message to all the interested clients, which, in this example, is Client B (Stage 2).

Client B sends a command request message to the server requesting the server to flip slide to slide #5 at time 12:00:02 (Stage 3). Upon sending this command request message, Client B creates a new entry (entry #201) in its request-response matching table that corresponds to the command request message since Client B expects to receive a command response message from the server. Client B indicates in entry #201 that the command type is "flip slide," the command timestamp is "12:00:02," the matching parameters are "slide #5," the client ID is "B," and the timer ID is "T201." Subsequent to creating entry #201, Client B receives the backchannel message regarding slide #2 (Stage 4). Upon receiving the backchannel message, Client B checks the unmatched entries in its request-response matching table to see if there is an unmatched entry that matches the backchannel message. Unable to find a matching entry, Client B creates a new entry (entry #202) in its request-response matching table that corresponds to the backchannel message. Client B indicates in entry #202 that the command type is "flip slide," the command timestamp is "12:00:01," the matching parameters are "slide #2," the client ID is "A," and the timer ID is "T202." Client B then sends a backchannel message that corresponds to the command request message to all the interested clients, which, in this example, is Client A (Stage 5).

Client A and Client B each receives a command response message from the server to show slide #2 (Stage 6). Upon receiving this command response message, Client A determines that the message was received at time 12:00:05, and identifies from the command response message that the command response type attribute is "show slide" and the matching parameters attributes are "slide #2." Client A uses the identified attributes to check the unmatched entries in its request-response matching table—i.e., entry #99—to see if there is a match. With regard to entry #99, Client A determines that the command response type "show slide" matches the command type "flip slide," and that the matching parameters from entry #99 and from the command response message are the same. Upon determining that entry #99 matches the command response message, Client A completes the remaining fields of entry #99 to indicate a match and cancels the timeout timer T99. As depicted, Client A indicates in entry #99 that the command response type is "show slide," the response timestamp is "12:00:05," and the result is "success."

As for Client B, upon receiving the command response message, Client B determines that the message was received at time 12:00:05, and identifies from the command response message that the command response type attribute is "show slide" and the matching parameters attributes are "slide #2." Client B uses the identified attributes to check the unmatched entries in its request-response matching table—i.e., entry #201 and entry #202—to see if there is a match. With regard to entry #201, Client B determines that, while the command response type "show slide" matches the command type "flip slide," the matching parameters "slide #2" does not match "slide #5," and thus, entry #201 fails to match the command response message. With regard to entry #202, Client B determines that the command response type "show slide" matches the command type "flip slide," and that the matching parameters from entry #202 and from the command response message are the same. Upon determining that entry #202 matches the command response message, Client B completes the remaining fields of entry #202 to indicate a match and cancels the timeout timer T202. As depicted, Client B indicates in entry #202 that the command response type is "show slide," the response timestamp is "12:00:05," and the result is "success."

Client A and Client B each receives a command response message from the server to show slide #5 (Stage 7). Upon receiving this command response message, Client A determines that the message was received at time 12:00:08, and identifies from the command response message that the command response type attribute is "show slide" and the matching parameters attributes are "slide #5." Client A uses the identified attributes to check the unmatched entries in its request-response matching table to see if there is a match. Unable to find a matching entry, Client A creates a new entry (entry #100) in its request-response matching table that corresponds to the received command response message. Client A indicates in entry #100 that the command response type is "show slide," the response timestamp is "12:00:08," and the matching parameters are "slide #5."

As for Client B, upon receiving the command response message, Client B determines that the message was received at time 12:00:08, and identifies from the command response message that the command response type attribute is "show slide" and the matching parameters attributes are "slide #5." Client B uses the identified attributes to check the unmatched entries in its request-response matching table—i.e., entry #201—to see if there is a match. With regard to entry #201, Client B determines that the command response type "show slide" matches the command type "flip slide," and that the matching parameters from entry #201 and from the command response message are the same. Upon determining that entry #201 matches the command response message, Client B completes the remaining fields of entry #201 to indicate a match and cancels the timeout timer T201. As depicted, Client B indicates in entry #201 that the command response type is "show slide," the response timestamp is "12:00:08," and the result is "success."

Client A then receives the backchannel message regarding slide #5 (Stage 8). Upon receiving the backchannel message, Client A identifies from the backchannel message that the command type attribute is "flip slide" and the matching parameters attributes are "slide #5." Client A uses the identified attributes to check the unmatched entries in its request-response matching table—i.e., entry #100—to see if there is a match. With regard to entry #100, Client A determines that the command type "flip slide" matches the command response type "show slide," and that the matching parameters from entry #100 and from the backchannel message are the same. Upon determining that entry #100 matches the backchannel message, Client A completes the remaining fields of entry #100 to indicate a match. As depicted, Client A indicates in entry #100 that the command type is "flip slide," the response timestamp is "12:00:02," the client ID is "B," and the result is "success."

FIG. 7 is a display description illustrating how a client purges unmatched entries in its request-response matching table, according to one embodiment. Similar to the example above, Client A sends a command request message to the server requesting the server to flip slide to slide #2 at time 12:00:01 (Stage 1). Upon sending this command request message, Client A creates a new entry (entry #99) in its request-response matching table that corresponds to the command request message since Client A expects to receive a command response message from the server. Client A indicates in entry #99 that the command type is "flip slide," the command timestamp is "12:00:01," the matching parameters are "slide #2," the client ID is "A." Client A then sends a backchannel message that corresponds to the command request message to all the interested clients, which, in this example, is Client B (Stage 2).

Client A then receives a backchannel message regarding slide #5 from Client B (Stage 3). Upon receiving the backchannel message, Client A checks the unmatched entries in its request-response matching table to see if there is an unmatched entry that matches the backchannel message. Unable to find a matching entry, Client A creates a new entry (entry #100) in its request-response matching table that corresponds to the backchannel message. Client A indicates in entry #100 that the command type is "flip slide," the command timestamp is "12:00:02," the matching parameters are "slide #5," and the client ID is "B." Client A then receives another backchannel message regarding slide #6 from Client B (Stage 4). Upon receiving the backchannel message, Client A checks the unmatched entries in its request-response matching table to see if there is an unmatched entry that matches the backchannel message. Unable to find a matching entry, Client A creates a new entry (entry #101) in its request-response matching table that corresponds to the backchannel message. Client A indicates in entry #101 that the command type is "flip slide," the command timestamp is "12:00:03," the matching parameters are "slide #6," and the client ID is "B."

Client A then receives a command response message from the server to show slide #2 (Stage 5). Upon receiving this command response message, Client A determines that the message was received at time 12:00:05, and identifies from the command response message that the command response type attribute is "show slide" and the matching parameters attributes are "slide #2." Client A uses the identified attributes to check the unmatched entries in its request-response matching table—i.e., entry #99-101—to see if there is a match. With regard to entry #99, Client A determines that the command response type "show slide" matches the command type "flip slide," and that the matching parameters from entry #99 and from the command response message are the same. Upon determining that entry #99 matches the command response message, Client A completes the remaining fields of entry #99 to indicate a match. As depicted, Client A indicates in entry #99 that the command response type is "show slide," the response timestamp is "12:00:05," and the result is "success." Having found a match, Client A does not need to check the other unmatched entries.

Client A then receives a command response message from the server to show slide #6 (Stage 6). Upon receiving this command response message, Client A determines that the message was received at time 12:00:08, and identifies from the command response message that the command response type attribute is "show slide" and the matching parameters attributes are "slide #6." Client A uses the identified attributes to check the unmatched entries in its request-response matching table—i.e., entry #100 and entry #101—to see if there is a match. With regard to entry #100, Client A determines that, while the command response type "show slide" matches the command type "flip slide," the matching parameters "slide #6" does not match "slide #5," and thus, entry #100 fails to match the command response message. With regard to entry #101, Client A determines that the command response type "show slide" matches the command type "flip slide," and that the matching parameters from entry #101 and from the command response message are the same. Upon determining that entry #101 matches the command response message, Client A completes the remaining fields of entry #101 to indicate a match. As depicted, Client A indicates in entry #101 that the command response type is "show slide," the response timestamp is "12:00:08," and the result is "success."

Subsequent to finding a matching entry in the request-response table, Client A checks all preceding unmatched entries in the request-response table to determine whether the unmatched entry should be purged from the table. In one embodiment, the client purges all unmatched entries that are from the same original sender and of the same request and response message type as the matched entry. In this instance, Client A checks unmatched entry #100 and determines that it has the same client ID and the command type as the matched entry (entry #101). Thus, Client A purges entry #100 from its request-response matching table so that it will not be used in a subsequent match. For example, Client A indicates in entry #100 that the result is "failure."

From the foregoing, it will be appreciated that embodiments of the invention have been described herein for purposes of illustration, but that various modifications may be made without deviating from the spirit and scope of the invention. Accordingly, the invention is not limited except in accordance with elements explicitly recited in the appended claims.

We claim:

1. A computer-implemented method for calculating performance metrics using backchannel messaging and information pattern matching, the method comprising:
   establishing a communication backchannel to at least one remote client;
   responsive to sending a command request message to a server, sending a backchannel message corresponding to the command request message to the remote client, wherein the backchannel message indicates a time the command request message was sent to the server, the command requested to be performed by the server, and command parameters needed to identify the command;
   responsive to receiving a command response message from the server, determining a time the command response message was received and checking to determine whether the command response message matches a previously received backchannel message, and
   responsive to determining that the command response message matches a previously received backchannel message, indicating the previously received backchannel message as matched; and
   responsive to determining that the command response message does not match any previously received backchannel message, storing the command response message in a table; and
   responsive to receiving a backchannel message from one of the remote clients, checking to determine whether the backchannel message matches a previously received command response message, and
   responsive to determining that the backchannel message matches a previously received command response message, indicating the previously received command response message as matched; and
   responsive to determining that the backchannel message does not match any previously received command response message, storing the backchannel message in a table.

2. The method of claim 1, wherein storing the command response message comprises creating an entry in the table corresponding to the command response message, the entry specifying a command response type, other additional information necessary to identify the command response type, and the time the command response message was received at the client.

3. The method of claim 1, wherein storing the backchannel message comprises creating an entry in the table corresponding to the backchannel message, the entry specifying a command type, other additional information necessary to identify the command type, and the time the command request message was sent to the server.

4. The method of claim 3, wherein the entry further specifies a sending client that originally sent the command request message to the server.

5. The method of claim 1 further comprising, responsive to determining that the command response message matches a previously received backchannel message, or responsive to determining that the backchannel message matches a previously received command response message, determining a latency metric as the difference between the time indicated in the backchannel message and the time the command response message was received at the client.

6. The method of claim 1 further comprising, responsive to determining that the command response message matches a previously received backchannel message, purging all previously received backchannel messages that are from the same client as the matched backchannel message and are of the same command type as the matched backchannel message.

7. The method of claim 1, wherein storing the backchannel message in the table further comprises setting a timeout timer, wherein the timeout timer indicates a time duration within which a command response message that matches the backchannel message is to be received at the client.

8. The method of claim 7, wherein indicating the previously received backchannel message as matched further comprises canceling a timeout timer corresponding to the previously received backchannel message.

9. A computer-readable medium whose contents cause a client to match a command response message to its corresponding command request message, by causing the client to:
    establish a communication backchannel to at least one remote client;
    responsive to sending a command request message to a server, send a backchannel message corresponding to the command request message to the remote client via the communication backchannel, wherein the backchannel message indicates a time the command request message was sent to the server, the activity requested of the server, and command parameters needed to identify the activity;
    responsive to receiving a command response message from the server, determine a time the command response message was received and determine whether the command response message matches a previously received backchannel message, and
        responsive to determining that the command response message matches a previously received backchannel message, indicate the previously received backchannel message as matched; and
        responsive to determining that the command response message does not match any previously received backchannel message, store the command response message in a table; and
    responsive to receiving a backchannel message from one of the remote clients, determine whether the backchannel message matches a previously received command response message, and
        responsive to determining that the backchannel message matches a previously received command response message, indicate the previously received command response message as matched; and
        responsive to determining that the backchannel message does not match any previously received command response message, store the backchannel message in a table.

10. The computer-readable medium of claim 9, wherein the client stores the command response message by creating an entry in the table corresponding to the command response message, the entry specifying a command response type, other additional information necessary to identify the command response type, and the time the command response message was received at the client.

11. The computer-readable medium of claim 9, wherein the client stores the backchannel message by creating an entry in the table corresponding to the backchannel message, the entry specifying a command type, other additional information necessary to identify the command type, and the time the command request message was sent to the server.

12. The computer-readable medium of claim 11, wherein the entry further specifies a sending client that originally sent the command request message to the server.

13. The computer-readable medium of claim 9, wherein the client, responsive to determining that the command response message matches a previously received backchannel message, or responsive to determining that the backchannel message matches a previously received command response message, further determines a latency metric as the difference between the time indicated in the backchannel message and the time the command response message was received at the client.

14. The computer-readable medium of claim 9, wherein the client, responsive to determining that the command response message matches a previously received backchannel message, further purges all previously received backchannel messages that are from the same client as the matched backchannel message and are of the same command type as the matched backchannel message.

15. The computer-readable medium of claim 9, wherein the client stores the backchannel message in the table by setting a timeout timer, wherein the timeout timer indicates a time duration within which a command response message that matches the backchannel message is to be received at the client.

16. The computer-readable medium of claim 15, wherein the client indicates the previously received backchannel message as matched by canceling a timeout timer corresponding to the previously received backchannel message.

* * * * *

UNITED STATES PATENT AND TRADEMARK OFFICE
CERTIFICATE OF CORRECTION

PATENT NO. : 7,587,449 B2  Page 1 of 1
APPLICATION NO. : 11/067595
DATED : September 8, 2009
INVENTOR(S) : Shah et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1232 days.

Signed and Sealed this

Twenty-first Day of September, 2010

David J. Kappos
*Director of the United States Patent and Trademark Office*